United States Patent
Cronin et al.

(10) Patent No.: US 9,398,213 B1
(45) Date of Patent: Jul. 19, 2016

(54) SMART FIELD GOAL DETECTOR

(71) Applicant: ProSports Technologies, LLC, Miami, FL (US)

(72) Inventors: John E. Cronin, Bonita Springs, FL (US); Nick Reasner, Chicago, IL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,081

(22) Filed: Jul. 13, 2015

Related U.S. Application Data (60) Provisional application No. 62/023,596, filed on Jul. 11, 2014.

(51) Int. Cl.
| | |
|---|---|
| H04N 7/18 | (2006.01) |
| H04N 5/232 | (2006.01) |
| A63B 71/06 | (2006.01) |
| A63B 24/00 | (2006.01) |
| H04N 5/247 | (2006.01) |

(52) U.S. Cl.
CPC ........ *H04N 5/23229* (2013.01); *A63B 24/0021* (2013.01); *A63B 71/0605* (2013.01); *H04N 5/23222* (2013.01); *H04N 5/247* (2013.01); *A63B 2024/0028* (2013.01)

(58) Field of Classification Search
CPC .... A63B 71/06; A63B 24/00; A63B 2220/05; A63C 19/00
USPC ....................................................... 348/157
See application file for complete search history.

(56) References Cited

U.S. PATENT DOCUMENTS

| | | | |
|---|---|---|---|
| 4,763,284 | A | 8/1988 | Carlin |
| 4,771,394 | A | 9/1988 | Cavanagh |
| 5,293,354 | A | 3/1994 | Costabile |
| 5,462,275 | A | 10/1995 | Lowe et al. |
| 6,013,007 | A | 1/2000 | Root et al. |
| 6,181,236 | B1 | 1/2001 | Schneider |
| 6,389,368 | B1 | 5/2002 | Hampton |
| 6,603,711 | B2 | 8/2003 | Calace |
| 6,760,276 | B1 | 7/2004 | Karr |
| 6,836,744 | B1 | 12/2004 | Asphahani et al. |
| 7,020,336 | B2 | 3/2006 | Cohen-Solal et al. |
| 7,031,225 | B2 | 4/2006 | McDonald |

(Continued)

FOREIGN PATENT DOCUMENTS

| | | |
|---|---|---|
| AU | 2014100006 | 2/2014 |
| CN | 102527007 | 7/2012 |

(Continued)

OTHER PUBLICATIONS

"About Head Case", Head Case Company, Sep. 24, 2013.

(Continued)

*Primary Examiner* — Shan Elahi
(74) *Attorney, Agent, or Firm* — Polsinelli LLP (57) ABSTRACT

Systems for detecting a successful field goal are described herein. More specifically, the systems are directed at automated detection for a field goal attempt. The systems evaluate whether the football was kicked within the designated area (e.g., above the cross bar and between the two upright poles). The detection is performed through the use of cameras, lasers and detectors associated with the field goal post. In this way, the systems assist referees in determining the success of the field goal attempt.

7 Claims, 4 Drawing Sheets

(56) References Cited

U.S. PATENT DOCUMENTS

| | | |
|---|---|---|
| 7,115,053 B2 | 10/2006 | Meichner |
| 7,173,533 B1 | 2/2007 | Beron et al. |
| 7,174,277 B2 | 2/2007 | Vock et al. |
| 7,561,494 B2 | 7/2009 | Stern |
| 7,561,723 B2 | 7/2009 | Goldberg et al. |
| 7,602,301 B1 | 10/2009 | Stirling et al. |
| 7,618,312 B1 | 11/2009 | Kasten |
| 7,634,662 B2 | 12/2009 | Monroe |
| 7,693,668 B2 | 4/2010 | Vock et al. |
| 7,715,723 B2 | 5/2010 | Kagawa et al. |
| 7,805,149 B2 | 9/2010 | Werner et al. |
| 7,920,052 B2 | 4/2011 | Costabile |
| 8,054,174 B1 | 11/2011 | Uehran |
| 8,098,881 B2 | 1/2012 | Camp et al. |
| 8,239,146 B2 | 8/2012 | Vock et al. |
| 8,253,586 B1 | 8/2012 | Matak |
| 8,257,084 B1 | 9/2012 | Kreiner et al. |
| 8,257,228 B2 | 9/2012 | Quartrochi et al. |
| 8,289,185 B2 | 10/2012 | Alonso |
| 8,326,136 B1 | 12/2012 | Clark |
| 8,396,687 B2 | 3/2013 | Vock et al. |
| 8,477,046 B2 | 7/2013 | Alonso |
| 8,485,879 B2 | 7/2013 | Lin et al. |
| 8,554,495 B2 | 10/2013 | Mack et al. |
| 8,554,509 B2 | 10/2013 | Crisco et al. |
| 8,579,632 B2 | 11/2013 | Crowley |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,684,819 B2 | 4/2014 | Thomas et al. |
| 8,702,504 B1 | 4/2014 | Hughes et al. |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 8,994,498 B2 | 3/2015 | Agrafioti et al. |
| 2001/0048484 A1 | 12/2001 | Tamir et al. |
| 2003/0163287 A1 | 8/2003 | Vock et al. |
| 2003/0210612 A1 | 11/2003 | Stern |
| 2005/0046584 A1* | 3/2005 | Breed ................ B60C 11/24 340/13.31 |
| 2005/0117022 A1 | 6/2005 | Marchant |
| 2005/0162257 A1 | 7/2005 | Gonzalez |
| 2005/0242508 A1 | 11/2005 | Meichner |
| 2005/0277466 A1 | 12/2005 | Lock |
| 2006/0052147 A1 | 3/2006 | Matthews |
| 2006/0109089 A1 | 5/2006 | Boehm et al. |
| 2006/0180073 A1 | 8/2006 | Nakamoto |
| 2006/0208169 A1* | 9/2006 | Breed ................ B60N 2/002 250/221 |
| 2006/0281061 A1 | 12/2006 | Hightower et al. |
| 2007/0003113 A1 | 1/2007 | Goldberg |
| 2007/0135264 A1 | 6/2007 | Rosenberg |
| 2007/0269203 A1 | 11/2007 | Awazu |
| 2008/0082311 A1 | 4/2008 | Meijer et al. |
| 2008/0129825 A1* | 6/2008 | DeAngelis ......... A63B 24/0021 348/169 |
| 2008/0146302 A1 | 6/2008 | Olsen et al. |
| 2009/0023122 A1 | 1/2009 | Lieberman et al. |
| 2009/0029754 A1 | 1/2009 | Slocum et al. |
| 2009/0111582 A1 | 4/2009 | Schuler et al. |
| 2009/0256912 A1 | 10/2009 | Rosenberg |
| 2010/0026809 A1 | 2/2010 | Curry |
| 2010/0030350 A1 | 2/2010 | House et al. |
| 2010/0102938 A1 | 4/2010 | Delia et al. |
| 2010/0105503 A1* | 4/2010 | Daisher ............ A63B 24/0021 473/467 |
| 2010/0144414 A1 | 6/2010 | Edis et al. |
| 2010/0185398 A1 | 7/2010 | Berns et al. |
| 2010/0283630 A1 | 11/2010 | Alonso |
| 2011/0013087 A1 | 1/2011 | House et al. |
| 2011/0064281 A1 | 3/2011 | Chan |
| 2011/0169959 A1 | 7/2011 | DeAngelis et al. |
| 2011/0181418 A1 | 7/2011 | Mack et al. |
| 2011/0184320 A1 | 7/2011 | Shipps et al. |
| 2012/0002509 A1 | 1/2012 | Saguin et al. |
| 2012/0052947 A1 | 3/2012 | Yun |
| 2012/0063272 A1 | 3/2012 | Dorais et al. |
| 2012/0081531 A1 | 4/2012 | DeAngelis et al. |
| 2012/0099405 A1 | 4/2012 | Lidor et al. |
| 2012/0116548 A1 | 5/2012 | Goree et al. |
| 2012/0120201 A1 | 5/2012 | Ward |
| 2012/0124720 A1 | 5/2012 | Evans et al. |
| 2012/0166449 A1 | 6/2012 | Pitaliya |
| 2012/0202594 A1 | 8/2012 | Bistis et al. |
| 2012/0212505 A1 | 8/2012 | Burroughs et al. |
| 2012/0223833 A1 | 9/2012 | Thomas et al. |
| 2012/0324491 A1 | 12/2012 | Bathiche et al. |
| 2013/0018494 A1 | 1/2013 | Amini |
| 2013/0060168 A1 | 3/2013 | Chu et al. |
| 2013/0066448 A1 | 3/2013 | Alonso |
| 2013/0080222 A1 | 3/2013 | Quinn |
| 2013/0095924 A1 | 4/2013 | Geisner et al. |
| 2013/0126713 A1 | 5/2013 | Haas et al. |
| 2013/0138590 A1 | 5/2013 | Huke et al. |
| 2013/0139068 A1 | 5/2013 | Bowring |
| 2013/0141555 A1 | 6/2013 | Ganick et al. |
| 2013/0166048 A1 | 6/2013 | Werner et al. |
| 2013/0222133 A1 | 8/2013 | Schultz et al. |
| 2013/0235702 A1 | 9/2013 | Saguin et al. |
| 2013/0249708 A1 | 9/2013 | Moll-Carrillo et al. |
| 2013/0279917 A1 | 10/2013 | Son et al. |
| 2013/0303192 A1 | 11/2013 | Louboutin |
| 2013/0316837 A1 | 11/2013 | Coiner, Jr. |
| 2013/0317835 A1 | 11/2013 | Mathew |
| 2013/0322689 A1 | 12/2013 | Carmichael |
| 2013/0324239 A1 | 12/2013 | Ur et al. |
| 2013/0328917 A1 | 12/2013 | Zambetti |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335635 A1 | 12/2013 | Ghanem et al. |
| 2013/0336662 A1 | 12/2013 | Murayama et al. |
| 2013/0343762 A1 | 12/2013 | Murayama et al. |
| 2014/0004939 A1 | 1/2014 | Kasten |
| 2014/0039354 A1 | 2/2014 | Greenwald et al. |
| 2014/0039355 A1 | 2/2014 | Crisco et al. |
| 2014/0039651 A1 | 2/2014 | Crowley |
| 2014/0062773 A1 | 3/2014 | MacGougan |
| 2014/0065962 A1 | 3/2014 | Le |
| 2014/0068847 A1 | 3/2014 | Kitowski |
| 2014/0071221 A1 | 3/2014 | Dave |
| 2014/0080638 A1* | 3/2014 | Feng .................. A63B 69/002 473/439 |
| 2014/0088454 A1 | 3/2014 | Mack |
| 2014/0105084 A1 | 4/2014 | Chhabra |
| 2014/0105466 A1 | 4/2014 | Botes et al. |
| 2014/0107817 A1 | 4/2014 | Ellis et al. |
| 2014/0111352 A1 | 4/2014 | Doherty |
| 2014/0125702 A1 | 5/2014 | Santillan et al. |
| 2014/0139380 A1 | 5/2014 | Ouyang |
| 2014/0141803 A1 | 5/2014 | Marti |
| 2014/0143940 A1 | 5/2014 | Luliano et al. |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0168477 A1 | 6/2014 | David |
| 2014/0171114 A1 | 6/2014 | Marti |

(56) References Cited

U.S. PATENT DOCUMENTS

| | | | |
|---|---|---|---|
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0218184 A1 | 8/2014 | Grant et al. | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0241730 A1 | 8/2014 | Jovicic et al. | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0270375 A1 | 9/2014 | Canavan et al. | |
| 2014/0274150 A1 | 9/2014 | Marti | |
| 2014/0278218 A1 | 9/2014 | Chang | |
| 2014/0283135 A1 | 9/2014 | Shepherd | |
| 2014/0293959 A1 | 10/2014 | Singh | |
| 2014/0361906 A1* | 12/2014 | Hughes | H04W 84/18 340/870.01 |
| 2014/0363168 A1 | 12/2014 | Walker | |
| 2014/0364089 A1 | 12/2014 | Lienhart | |
| 2014/0364148 A1 | 12/2014 | Block | |
| 2014/0365120 A1 | 12/2014 | Vulcano | |
| 2014/0365640 A1* | 12/2014 | Wohl | G06K 7/10227 709/224 |
| 2014/0371887 A1 | 12/2014 | Hoffman et al. | |
| 2014/0375217 A1 | 12/2014 | Feri et al. | |
| 2015/0011242 A1 | 1/2015 | Nagaraj | |
| 2015/0026623 A1 | 1/2015 | Horne et al. | |
| 2015/0031397 A1 | 1/2015 | Jouaux | |
| 2015/0081713 A1 | 3/2015 | Alonso et al. | |
| 2015/0131845 A1 | 5/2015 | Forouhar et al. | |
| 2015/0187188 A1 | 7/2015 | Raskin | |
| 2015/0296272 A1* | 10/2015 | Sonabend | A61H 99/00 725/32 |
| 2015/0306457 A1 | 10/2015 | Crankson et al. | |
| 2016/0001159 A1 | 1/2016 | Riley et al. | |
| 2016/0008693 A1 | 1/2016 | Cronin | |
| 2016/0012810 A1 | 1/2016 | Cronin | |
| 2016/0096074 A1 | 4/2016 | Moll-Carrillo et al. | |
| 2016/0107064 A1 | 4/2016 | Hoffman et al. | |

FOREIGN PATENT DOCUMENTS

| | | |
|---|---|---|
| CN | 102843186 | 12/2012 |
| EP | 2 407 218 | 1/2012 |
| WO | WO 2008/030484 | 3/2008 |
| WO | WO 2009/104921 | 8/2009 |
| WO | WO 2011/004381 | 1/2011 |
| WO | WO 2012/100053 | 7/2012 |
| WO | WO 2013/011259 | 1/2013 |
| WO | WO 2013/166456 | 11/2013 |
| WO | WO 2014/008134 | 1/2014 |
| WO | WO 2014/052874 | 4/2014 |
| WO | WO 2014/100519 | 6/2014 |
| WO | WO 2016/007969 | 1/2016 |
| WO | WO 2016/007970 | 1/2016 |

OTHER PUBLICATIONS

"adidas' miCoach Speed_Cell and miCoach Football App Aim to Advance the Performance of Next-Generation Athletes Through New Technology", miCoach, Nov. 22, 2011.

"Advanced E-Team: Automatic Sports Time Stopping Whistle", Rose-Hulman Institute of Technology, 2002, NCIIA Funded Advanced E-Teams. Date of Download: Jun. 14, 2014. http://www.nciia.org/WebObjects/NciiaResources.woa/wa/View/GrantProfile?n=1000037.

"Affordable Concussion Management System for Young Athletes Offered by Head Case", Head Case Company, Sep. 24, 2013.

Ancona et al., N.; "Goal detection in football by using Support Vector Machines for classification" Neural Networks, vol. 1, pp. 611-616, 2001.

"AutoScout" ADSC Illinous at Singapore Pte Ltd. Sep. 21, 2015.

Belzer, Jason; "NFL Partners With Zebra Technologies to Provide Next Generation Player Tracking", Forbes/Sports Money, Jul. 31, 2014.

Brolinson et al., P. Gunner; "Analysis of Linear Head Accelerations from Collegiate Football Impacts", Current Sports Medicine Reports, 2006, vol. 5:23-28.

"Chapter 29. Outdoor Laser Operations", U.S. Department of Transportation, Feb. 9, 2012.

Cooley, Chris; "MMQB: Smart Football", The Official Blog of Chris Cooley, Jul. 13, 2009.http://chriscooley47.blogspot.com/2009/07/mmqb-smart-football.html.

"Create Innovative Services with Play Apps", Date of Download: Jan. 16, 2014, http://www.oledcomm.com/LIFI.html, Oledcomm—France LiFi.

Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.

Dawson, Keith; "LiFi in the Real World" All LED Lighting—Illuminating The Led Community, Jul. 31, 2013.

Delgado, Rick; "Why Fantasy Football Is Embracing Big Data", Sporttechie, Jan. 3, 2014.

"Dutch Football Fans Get the Ajax Experience With AV Technology From Electrosonic", Electrosonic Press Release, May 14, 2012.

FAQ, Go Pro Workouts, Date of Download: Apr. 30, 2014 https://www.goproworkouts.com/faqs.

"First Down Laser Systems to enhance game of football and fans in-stadium experience with green line", Sports Techie, Sep. 9, 2013.

"Football Workout Programs", Go Pro Workouts. Date of Download: Apr. 27, 2014 https://www.goproworkouts.com/workouts/football.

Freeman, Mark; "Frickin' Laser Beams", River Valley Leader, Feb. 19, 2013.

Gerhardt, Ryan; "Concussion Sensing Helmet Could Save Athletes", PSFK, Oct. 28, 2013.

Gerhardt, Ryan; "Vibrating Jersey Lets Fans Feel What Players Do on the Field", PSFK.com, Mar. 13, 2014.

"GoalControl to provide goal-line system at World Cup in Brazil", BBC Sport, Apr. 2, 2013.

Gorman, Michael; "Outstanding Technology brings visible light communication to phones and tablets via dongle and LEDs", Edgadget International Editions, Jul. 16, 2012.

"Growing data sets alter Sportsvision's real-time viewing experience", Sports Illustrated, More Sports, Nov. 29, 2013.

Haas, Harald; "Delivering safe and secure wireless communications", pureLiFi. Date of download: Jan. 16, 2014 http://purelifi.co.uk/.

"How to compare personal stats with the Pros?", Support Home Discussions Training with miCoach. Jul. 4, 2012.

"How to wear the Stride Sensor (inside the shoe)", by micoach, Guides & Tutorials, May 29, 2014.

Inamoto et al., Naho; "Immersive Observation of Virtualized Soccer Match at Real Stadium Model", Proceedings of the Second IEEE and ACM International Symposium on Mixed and Augmented Reality (ISMAR '03), 2003.

"Intel, NFL Legend Jerry Rice and others Team Up to "Look Inside the Huddle" On and Off the Field", by INTELPR in Intel Newsroom, Aug. 28, 2013.

Kumar, Navin; "Visible Light Communications Systems Conception and VIDAS", IETE Technical Review, vol. 25, Issue 6, Nov.-Dec. 2008. Date of download: Nov. 19, 2009, http://www.tr.ietejournals.org.

La Confora, Jason; "NFL collecting data that could revolutionize websites, video games", CBS Sports—NFL Insider, Nov. 25, 2012.

Laviers, Kennard R.; Sukthankar, Gita; "Using Opponent Modeling to Adapt Team Play in American Football", Plan, Activity, and Recognition, Elsevier, 2014. School of ECE, Air Force Institute of Technology. Preprint submitted: Oct. 31, 2013.

LiFi Overview—Green wireless mobile communication—LiFi Technology. Date of download: Jan. 16, 2014.

(56) References Cited

OTHER PUBLICATIONS

Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
Macleod, Robert; "New football helmet sensors monitor brain injuries", The Globe and Mail, Nov. 14, 2013.
Madden, Lance; "Pro Athletes Share Personal Workout Secrets With Startup 'Go Pro Workouts'", Forbes.com, SportsMoney. Mar. 4, 2013.
Maricle, Charles; "Federal rules for outdoor laser user in the U.S. (FAA authority over airspace)", Laser PointerSafety.com, Apr. 23, 2014.
"Methods to Our Madness", Football Outsiders Information, Innovative Statistics, Intelligent Analysis, http://www.footballoutsiders.com/info/methods, Date of Download: Apr. 10, 2014.
Miller, Mark J.; "NFL Sensors Will Track Player Stats for Fans, but What About Safety?", Sports in the Spotlight—brandchannel, Aug. 11, 2014.
Montero, Eric, "Design and Implementation of Color-Shift Keying for Visible Light Communications", Sep. 2013, McMaster University.
Morgan, Debra; "Referee Uses Capital Idea to Stop Game Clocks on a Whistle", Loca News. Nov. 18, 1999. http://www.wral.com/news/local/story/138889.
Naidu, Vinaya; "Watched the IPL? Now Find and Tag Yourself in the Stadium With Vodafone Fancam", Business 2 Community, May 22, 2013.
"New courtside technology unveiled at PISD tourney", Precision Time Systems—New Inventions That Prevent Human Errors in Sports Timekeeping, Date of Download: Apr. 23, 2014.
Nguyen et al., "A Novel like switching scheme using pre-scanning and RSS prediction in visible light communication networks", EURASIP Journal on Wireless Communications and Networking, 2013.
"Nike+ SportBand User's Guide", by nikeplus.com, Jun. 7, 2014.
"Nokia Lumia 920 pricing compared to iPhone 5 and Samsung Galaxy SIII", by Nokia, Sep. 30, 2012.
Ogawa; "Article about VLC Guidance developed", Visible Light Communications Consortium (VLCC), Aug. 31, 2012.
Ogawa; "iPhone app from CASIO", Visible Light Communications Consortium (VLCC), Apr. 26, 2012.
Ogus, Simon; "SportIQ Announces a Game Changing Real-Time Basketball Analytics Platform", Sporttechie.com, Mar. 7, 2014.
"Omega introduces new timing equipment for ice hockey at Sochi 2014 Olympic Winter Games", Omega Watches, Feb. 16, 2014.
"Outdoor Laser Operations", Advisory Circular, U.S. Department of Transportation, Dec. 30, 2014.
Perin et al., Charles; "Real-Time Crowdsourcing of Detailed Soccer Data", IEEE, Oct. 2013.
Povey, Gordon, "VLC for Location, positioning and navigation", Jul. 27, 2011, http://visiblelightcomm.com/vlc-for-location-positioning-and-n.
"Riddell InSite Impact Response System", Riddell InSite. Oct. 18, 2013.
Roble, Bob; "Inside the Huddle: How Big Data Is Unlocking Fantasy Football Insights", IQ Sports—Sports Technology, Sep. 3, 2013.
Saag, Tonis; "You can compare your training data with friends again", SportlyzerBlog, Feb. 20, 2013.
"What is SafeBrain", SafeBrain Systems Inc. May 14, 2014.
Schoonmaker, Aaron; "NCAA ignoring own clock recommendations in tourney", WRALSportsFan.com, Mar. 25, 2014 http://www.wralsportsfan.com/ncaa-ignoring-own-clock-recommendations-in-tourney/13510770/.
"Smartabase—The complete solution for athlete data management", Fusion Sport, www.fusionsport.com, Jul. 21, 2011.
"Sports Event Services—Quality Information is the first gold medal at any event", Infostrada Sports, May 24, 2013.
Stein, Anne; "Devices help alert teams to potential concussions on the field", Tribune Newspapers, Jun. 27, 2012.

Thanigavel, M.; "Li-Fi Technology in Wireless Communication", International Journal of Engineering Research & Technology (IJERT), ISSN: 2278-0181, vol. 2 Issue 10, Oct. 2013.
"The Head Case Impact Sensor", Head Case Company, Sep. 24, 2013.
"The System Models & How They Work", Precision Time Systems—New Inventions That Prevent Human Errors in Sports Timekeeping, Date of Download: Apr. 24, 2014.
"The Wearables Coaching an Optimal Version of You", by PSFK Labs, iQ, Feb. 24, 2014.
"Train like professional athletes", Go Pro Workouts. Date of Download: Apr. 30, 2014 https://www.goproworkouts.com/.
"Viewing other miCoach stats", Support Home Discussions Training with miCoach, Jun. 26, 2012.
WKO—Hunter Allen—Peaks Coaching Group Oct. 14, 2015.
"Wirless Whistle System", Bodet Sport, Sport Display—Timer. Date of Download: Jun. 23, 2014 file:///Cl/king/AOP/Wireless%20Whistle%20system.htm[Jun. 23, 2014 7:32:06 PM].
Won, Eun Tae; "Visible Light Communication: Tutorial", Project: IEEE P802.15 Working Group for Wireless Personal Area Networks (WPANs), Mar. 9, 2008.
"Link: Would You Like to See the Goal-Post Lengthened in Height in College Football", TideFans.com, May 6, 2014. http://www.tidefans.com/forums/showthread.php?t=222422&page=4.
PCT Application No. PCT/US2015/033613 International Search Report and Written Opinion mailed Sep. 1, 2015.
PCT Application No. PCT/US2015/040228 International Search Report and Written Opinion mailed Sep. 30, 2015.
PCT Application No. PCT/US2015/040229 International Search Report and Written Opinion mailed Oct. 1, 2015.
PCT Application No. PCT/US2015/047059 International Search Report and Written Opinion mailed Nov. 9, 2015.
U.S. Appl. No. 14/798,049 Office Action mailed Nov. 3, 2015.
U.S. Appl. No. 14/798,091 Office Action mailed Sep. 22, 2015.
U.S. Appl. No. 14/788,728 Office Action mailed Sep. 17, 2015.
U.S. Appl. No. 14/788,742 Office Action mailed Sep. 2, 2015.
U.S. Appl. No. 14/798,035, John E. Cronin, Playbook Processor, filed Jul. 13, 2015.
PCT/US15/40228, Playbook Processor, Jul. 13, 2015.
U.S. Appl. No. 14/798,049, John E. Cronin, Whistle Play Stopper, filed Jul. 13, 2015.
PCT/US15/40229, Whistle Play Stopper, Jul. 13, 2015.
U.S. Appl. No. 14/798,0057, John E. Cronin, Professional Workout Simulator, Jul. 13, 2015.
U.S. Appl. No. 14/798,068, John E. Cronin, Player Hit System, filed Jul. 13, 2015.
U.S. Appl. No. 14/798,091, John E. Cronin, Real-Time Data Collection and Selective Storage, filed Jul. 13, 2015.
U.S. Appl. No. 14/798,131, John E. Cronin, Real-Time Data Collection and Storage for Use in Fantasy Football, Jul. 13, 2015.
U.S. Appl. No. 14/798,270, John E. Cronin, Sensor Experience Shirt, Jul. 13, 2015.
U.S. Appl. No. 14/798,204, John E. Cronin, Movement Monitoring Unit, filed Jul. 13, 2015.
U.S. Appl. No. 14/798,190, John E. Cronin, Player Movement, Jul. 13, 2015.
U.S. Appl. No. 14/829,598, John E. Cronin, Facial Recognition for Event Venue Cameras, filed Aug. 18, 2015.
PCT/US15/47059, Facial Recognition for Event Venue Cameras, Aug. 26, 2015.
U.S. Appl. No. 14/788,728, John E. Cronin, Player Movement Data, filed Jun. 30, 2015.
U.S. Appl. No. 14/788,742, John E. Cronin, Event Video Capture, filed Jun. 30, 2015.
U.S. Appl. No. 14/798,035 Office Action mailed Nov. 24, 2015.
U.S. Appl. No. 14/798,057 Office Action mailed Nov. 24, 2015.
U.S. Appl. No. 14/798,068 Office Action mailed Nov. 23, 2015.
U.S. Appl. No. 14/798,131 Office Action mailed Jan. 12, 2016.
U.S. Appl. No. 14/798,204 Office Action mailed Jan. 22, 2016.
U.S. Appl. No. 14/798,190 Office Action mailed Jan. 12, 2016.
U.S. Appl. No. 14/829,598 Office Action mailed Feb. 2, 2016.
U.S. Appl. No. 14/788,728 Final Office Action mailed Feb. 1, 2016.

(56) References Cited

OTHER PUBLICATIONS

U.S. Appl. No. 14/788,742 Final Office Action mailed Jan. 6, 2016.
U.S. Appl. No. 14/798,068 Final Office Action mailed May 5, 2016.
U.S. Appl. No. 14/798,131 Final Office Action mailed May 23, 2016.
U.S. Appl. No. 14/798,204 Final Office Action mailed May 11, 2016.
U.S. Appl. No. 14/788,742 Office Action mailed May 11, 2016.

* cited by examiner

FIG. 1
Smart Field Goal Detector System

FIG. 2 Examples

FIG. 3  Close-up of Vertical Lasers / Detectors 300

FIG. 4    Goal Controller Operation

SMART FIELD GOAL DETECTOR

CROSS-REFERENCE TO RELATED APPLICATIONS

The present application claims the priority benefit of U.S. provisional application No. 62/023,596 filed Jul. 11, 2014 and entitled "Smart Field Goal Detector," the disclosure of which is incorporated herein by reference.

BACKGROUND OF THE INVENTION

1. Field of Invention

The present invention generally relates to detecting objects. More specifically, the present invention relates to a smart field goal detector.

2. Description of the Related Art

American football (also referred to as football in the United States) is a sport that is played by two teams of eleven players on a rectangular field. The field has goal posts at each end. One of the ways the teams can score points in football is to kick (i.e., place kick or drop kick) the football through a field goal post also situated at the ends of the rectangular field during a play from scrimmage. The field goal post consists of two upright poles, which are eighteen feet and six inches apart, and a crossbar suspended ten feet above the ground. The upright poles extend from the ends of the crossbar.

To properly score a field goal, the team must kick the football above the cross bar and between the two upright poles. Presently, determination of whether a field goal is successful is performed visually from one or more officials (e.g., referees) situated at various points on the field. The referees determine whether the football was kicked above the cross bar and between the two upright poles.

There does not exist any technology that assists referees in making a determination whether a football kicked is a successful field goal or missed field goal. There may be situations where the football is kicked way above the vertical goal posts making it difficult for the various referees to evaluate whether the football was within the area defined by the two upright poles. Therefore, there is a need for a system that can be used to facilitate detection of the football during a field goal kick attempt.

SUMMARY OF THE CLAIMED INVENTION

The present invention is a system for detecting field goals. The system includes a camera and various sensors and detectors that are associated with a field goal post. A field goal controller receives location-based information regarding a location of the football during a field goal attempt. The field goal controller evaluates the received location-based information and makes a determination regarding the success of the field goal attempt. Based on the determination of the field goal attempt, the system can output a notification that indicates to the referees and other onlookers the success (or failure) of the field goal attempt.

DETAILED DESCRIPTION

The systems described herein are directed towards detection of whether a field goal was successfully kicked during a football game. More specifically, the systems automatically detect whether the football was kicked within the designated area (e.g., above the cross bar and between the two upright poles). The detection is performed through the use of lasers and detectors associated with the field goal post.

Even though the present disclosure is directed at detection of a field goal in football, it should be noted that the systems described herein may also be applied in other sports where determination of whether an object is within a designated space is also performed. For example, the present invention can be applied to detect whether a ball is within an allowed area of play.

Figure 1:
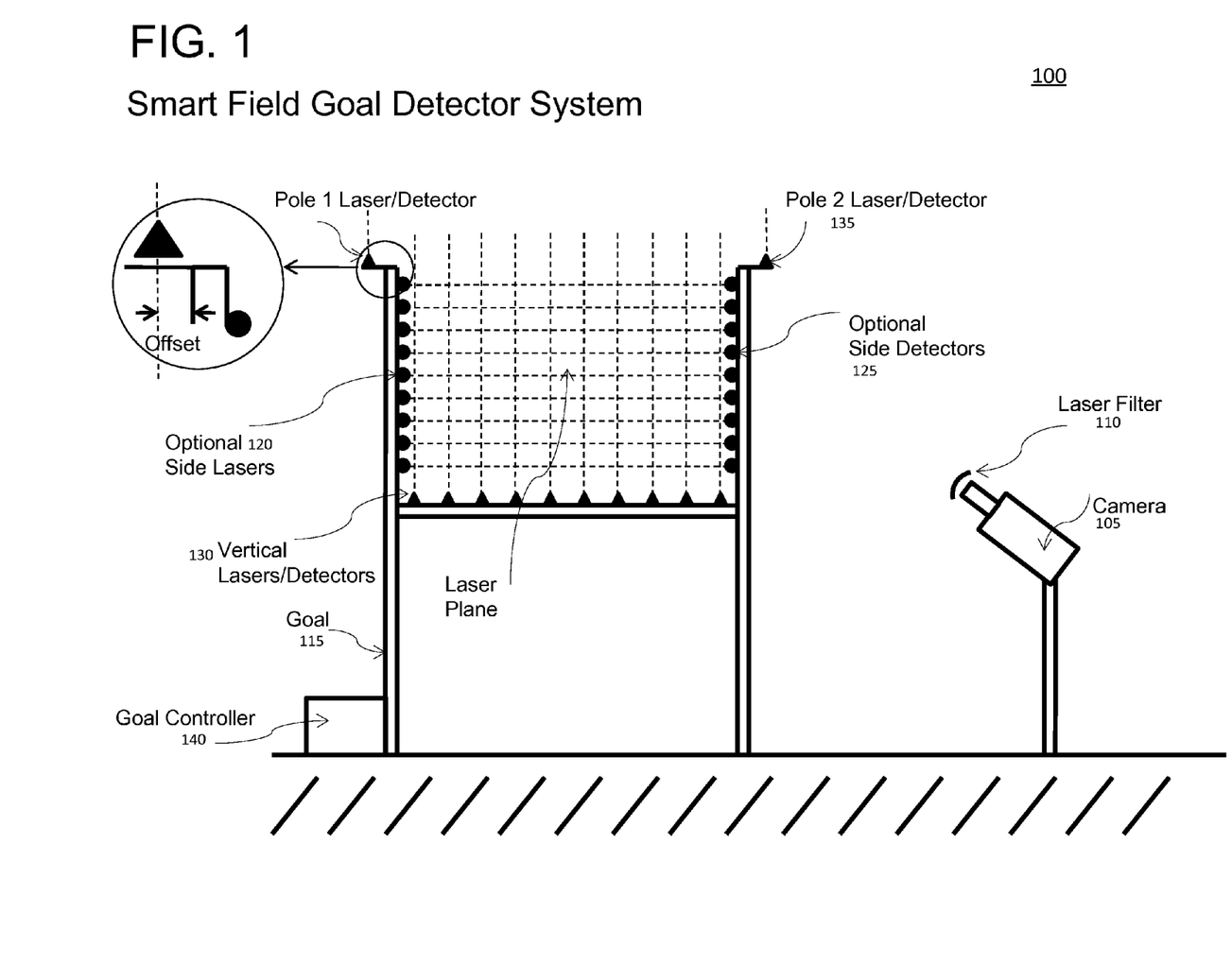
FIG. 1 illustrates a smart field goal detector system.

FIG. 1 illustrates a smart field goal detector system 100. The smart field goal detector system 100 includes a camera 105 with a laser filter 110 associated with the camera 105. The camera may be used to detect the lasers 120, 130 used with the smart field goal post 115. The filter 110 facilitates the camera 105 in detecting the lasers 120, 130. More specifically, the lasers may be invisible to the human eye and can only be detected by the camera 105. In some embodiments, the lasers are color lasers that the filter 110 may specifically be used to detect.

The field goal post 115 may be an already existing structure present in many of the football fields and used in football games. The field goal post 115 can be modified to include a plurality of lasers 120, 130 and detectors 125, 130. The lasers 120, 130 transmit straight lasers from one side to the other. For example, as illustrated in FIG. 1, the side lasers 120 can be seen transmitting lasers from left to right (i.e. from one upright post to the other upright post). The vertical lasers 130 can be seen shooting lasers from bottom (i.e. crossbeam) and upwards towards the sky.

With respect to the side lasers 120, each laser 120 on one side post may be lined up with a corresponding detector 125 on the opposite side post. In situations where the football is kicked within the laser plane covered by the side lasers 120 and detectors 125, the laser connection with the corresponding detector is broken (e.g., see FIG. 3). The smart field goal detector system 100 can then determine the location of the football based on which lasers were broken and evaluate whether the field goal attempt was successful based on the location of the broken lasers.

With respect to the vertical lasers and detectors 130, the arrangement is different than the arrangement of the side lasers 120 and detectors 125. Since the vertical lasers 130 will be shooting up vertically into the sky, each laser cannot have a corresponding detector on the opposite side. Instead, the vertical laser and detectors 130 are arranged in an alternating fashion (see FIG. 3). Similar in the way that side detectors 125 detect the location of broken lasers, the detectors associated with the vertical lasers 130 can also detect which lasers are broken. Further details pertaining to this detection is provided in FIG. 3. In any case, by determining the location of the football based on where the vertical lasers are interrupted, an evaluation can be performed as to whether the field goal attempt was successful (i.e., if the football was above the crossbeam and within the area denoted by the two side posts).

It should be noted that in some embodiments, the side lasers 120 and detectors 125 may be optional. One or more referees viewing the field goal kick may easily determine whether the football was kicked above the crossbeam. Furthermore, when the football is kicked within an area that is detectable by the side lasers and detectors 120, 125 the one or more referees are capable of easily determining that the field goal kick was successful. The concern is when the football is not within the space defined by the upright poles and detectable by the side lasers 120 and detectors 125. In situations where the football is above the two upright posts, the vertical lasers 130 are used to determine whether the field goal attempt was successful. The side lasers 120 and detectors 125 may be incapable of detecting footballs that are located above the side goal posts.

To facilitate detection of the location of the football and the determination whether the football is within the two side posts of the field goal post 115, the smart field goal detector system 100 may also include pole laser detectors 135 on the top of each of the upright poles. The pole laser detectors 135 are used to detect whether the football is outside or within the area defined by the upright posts.

It should be noted that the pole laser detectors 135 are situated slightly outside the location of the upright poles. The location of the pole laser detectors 135 are provided so that the lasers associated with the pole laser detectors 135 line up with the edge of the upright poles. In situations where the football breaks the lasers from the pole laser detectors 135, this can be detected and evaluated as an unsuccessful field goal attempt. Footballs that are within the two upright poles would not be detected by the pole laser detectors 135 but be detected by one or more vertical lasers and detectors 130. In this situation, the field goal attempt can be determined as being successful. Footballs that are outside the two upright poles would similarly be not detectable by the pole laser detectors 135. The vertical lasers and detectors 130, however, would be unable to detect the location of the football as well. In this way, the smart field goal detector system 100 can determine that the field goal attempt was a failure (i.e., the location of the football may be too far left or right). Further details pertaining to the possible scenarios for detecting field goal attempts are provided below in FIG. 2.

The goal controller 140 associated with the field goal post 115 is used to determine the location of the football with respect to the various lasers and detectors. The goal controller 140 can then evaluate whether a field goal attempt was successful or a failure based on the location of the football. Further details regarding the goal controller 140 are provided below in FIG. 4.

Figure 2:
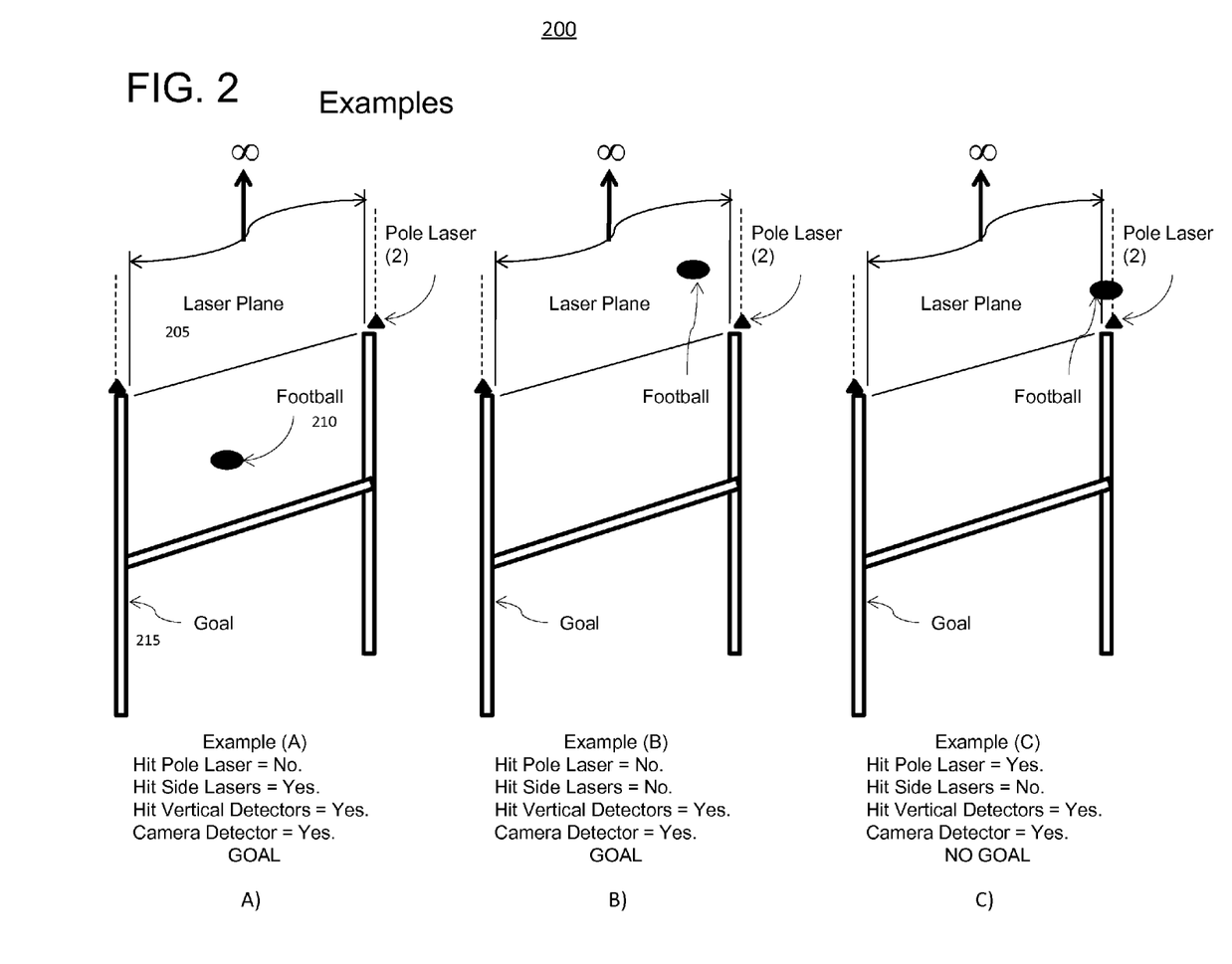
FIG. 2 illustrates exemplary scenarios for detecting field goal attempts.

FIG. 2 illustrates exemplary scenarios 200 for detecting field goal attempts. More specifically scenarios A, B and C illustrated in FIG. 2 provide the various different scenarios that the smart field goal detector system may be faced with in determining whether a field goal attempt was successful or not.

With each of the three scenarios, a laser plane 205 is illustrated. This plane 205 corresponds with an area defined by the pole lasers associated with the upright poles and the vertical lasers and detectors (e.g., FIG. 1). The laser plane is situated above an area where the crossbar (e.g., FIG. 1) of the field goal post 215. This area would be capable of detecting a football 210. This laser plane 205 can extend for a length vertically from the field goal post 215 and may depend on the strength of the laser used in detecting where the football 210 may possibly be found.

With each of the three scenarios, the goal controller can evaluate different logic situations to reach a conclusion whether a field goal attempt is successful or not. As illustrated in FIG. 2, the logic may include 1) whether the pole laser detects the football, 2) whether the side lasers/detectors detect the football, 3) whether the vertical lasers/detectors detect the football, and 4) whether the camera detector detects the football.

With respect to the pole lasers, these lasers are used to determine if the football 210 is within the upright poles. So long as the football 210 is detected by the vertical lasers and is not detected by the upright poles (i.e., within the laser plane 205), the field goal attempt is considered successful. As described above, the pole lasers are used to determine when a football 210 is outside the laser plane defined by the upright poles. Since the pole lasers are situated in an area outside of the laser plane 205, in situations where the football 210 is detected by the pole lasers, a determination can be made that the football 210 is in an area that is outside an imaginary area defined by the upright posts extended upwards.

With respect to the logic of the side lasers and the vertical lasers/detectors, the logic is used to determine if the football passed through the laser plane 205. Generally, the football must pass through the laser plane in some form for it to be considered a successful field goal. There may be some situations where the side lasers do not detect the football (e.g., when the football is kicked above the height of the upright poles) but so long as the football can be detected by the vertical lasers/detectors, the football 210 may be determined to be within the laser plane 205. In a situation where the vertical lasers/detectors do not detect the football 210 passing through the laser plane 205, such a field goal attempt would correspond with a failed field goal attempt. Such a situation may arise when either 1) the football falls short of the field goal post 215 or 2) passes through an area outside of the upright posts.

With respect to the logic with the camera detector, this may be used to ensure that the lasers and detectors associated with the field goal post 215 are operating properly. Generally, the camera detector should be able to capture where the football is located. In situations where the camera detector does not capture the football 210 but the goal controller determines that the lasers and sensors associated with the field goal post 215 detected an object, this may raise concerns as to what was detected and whether the information provided by the field goal controller can be used.

With respect to scenario A, the football 210 can be seen going through the laser plane 205 in an area between the two upright poles of the field goal post 215. With respect to scenario B, the football 210 can also be seen going through the laser plane 205 in an area between the two upright poles of the field goal post 215. The side lasers and detectors (as illustrated in FIG. 1), however, may be incapable of detecting the football 210. With respect to scenario C, the football 210 can be seen going through the laser plane 205. The football 210, however, is also detected by one of the pole lasers.

The corresponding logic for scenarios A, B and C are shown in FIG. 2. Generally, a field goal attempt is considered a successful field goal so long as the football 210 is detected by the vertical detectors and the camera detector without being detected by the pole laser. The combination of the logic ensures that the football 210 is within the laser plane 205 and within the two upright posts. The logic associated with the side lasers, although helpful in determining that the football 210 crossed the laser plane 205 within an area defined by the upright posts, is not required for a successful field goal attempt determination. In this way, the implementation of side lasers can be deemed optional.

With each of the three scenarios described above, corresponding logic and outcomes can be stored in the field goal controller used to identify the scenarios where a field goal attempt is deemed successful (e.g., scenarios A and B) from scenarios where the field goal attempt is deemed unsuccessful (e.g., scenario C).

Figure 3:
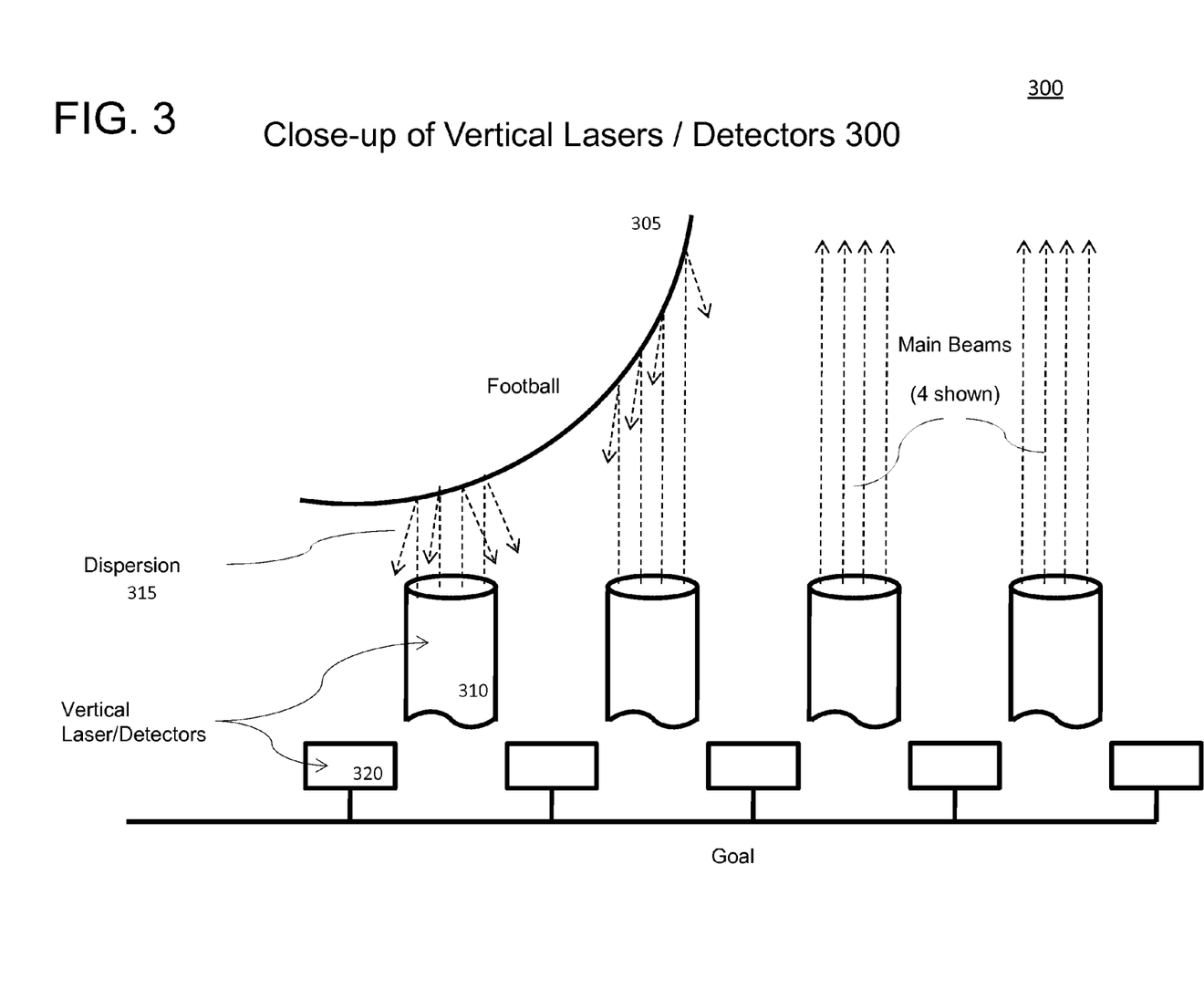
FIG. 3 illustrates operation of the lasers and detectors associated with the smart field goal detector system.

FIG. 3 illustrates operation of the lasers 310 and detectors 320 associated with the smart field goal detector system 300. More specifically, the figure illustrates operation of the lasers 310 and detectors 320 that are arranged on the crossbar of the field goal post used to detect a football 305 that is passing through the laser plane (as illustrated in FIG. 2). In some embodiments, the lasers and detectors associated with the upright posts may similarly be arranged as on the crossbar (e.g., alternating laser and detectors) thereby operating in a similar manner illustrated in FIG. 3.

As illustrated in the figure, the lasers 310 are situated on the crossbeam of the field goal post. The lasers are providing laser beams 315 that are traveling vertically from the crossbeam of the field goal post towards the sky. One or more detectors 320 may be situated in between consecutive lasers 310. In some embodiments, the detectors 320 may be arranged in a circular formation around each of the lasers 310.

In an embodiment as illustrated in FIG. 3, when the football 305 passes through the laser plane (as illustrated in FIG. 2), one or more laser beams 315 from the lasers 310 make contact with the football 305. Upon making contact with the football 305, some of the laser beams 315 may disperse/become deflected. The dispersed laser beams 315 are detected by the camera (as illustrated in FIG. 1) or by one or more detectors 320. From the dispersed laser beams 315, the field goal controller can determine the position of where the football is within the laser plane.

Figure 4:
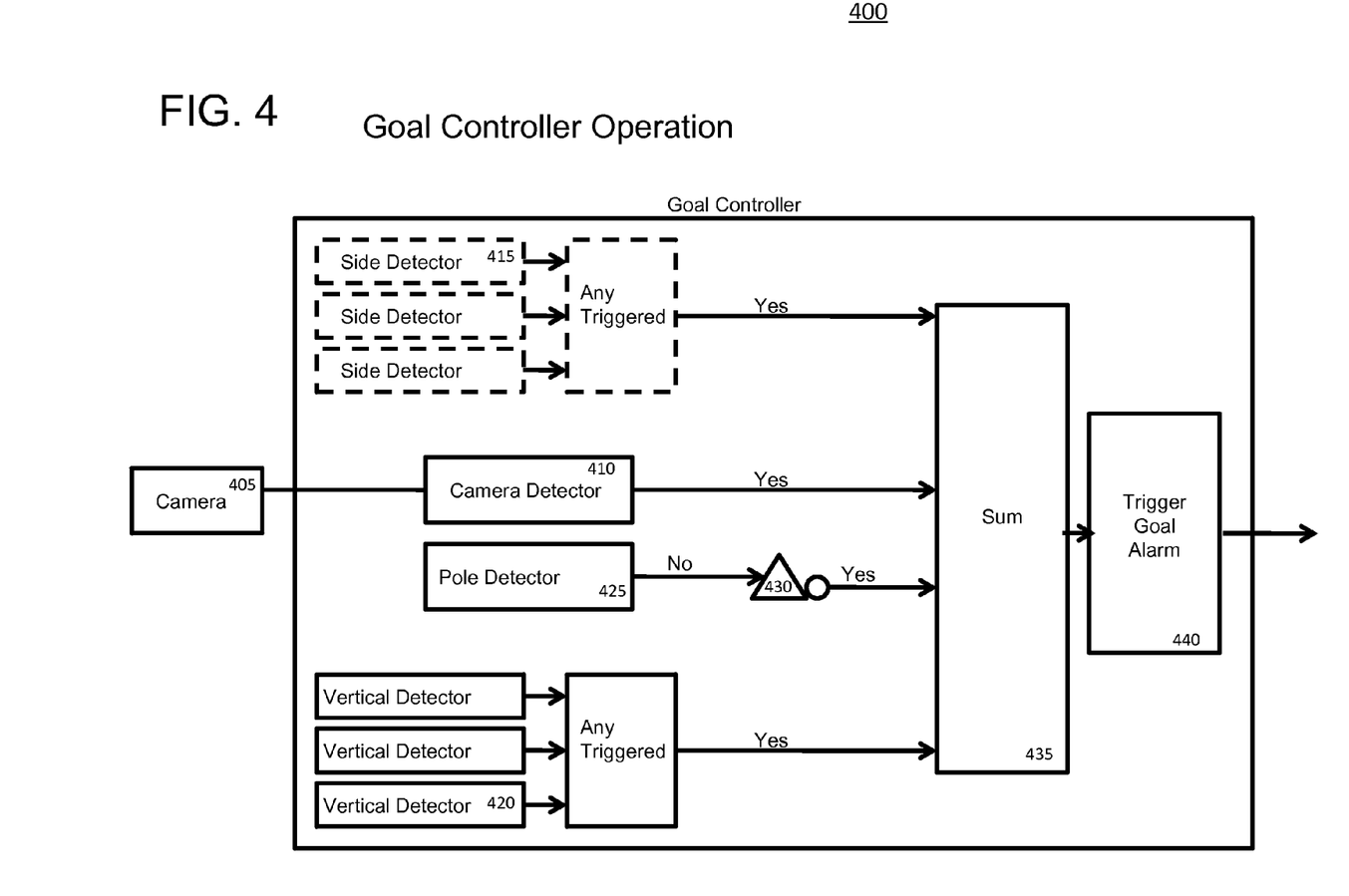
FIG. 4 illustrates the field goal controller.

FIG. 4 illustrates the field goal controller 400. The field goal controller 400 evaluates the information obtained from the camera (as illustrated in FIG. 1) and the various laser/detector pairs found on the upright post and the crossbeam of the field goal post. Based on the evaluated information, the field goal controller 400 determines whether a location of the football corresponds to a successful field goal attempt.

The field goal controller 400 can utilize up to four elements to determine whether a field goal attempt is successful. The first element corresponds with the camera 405. Input from the camera 405 is provided to the camera detector 410 to determine the location of the football. If, for example, the camera 405 detects dispersed lasers, the camera detector 410 outputs a "yes" signal indicating that, at least from the perspective of the camera, a successful field goal attempt has been detected.

With respect to the side detectors 415, there may be one side detector 415 associated with the field goal controller 400 associated with each laser/detector pair associated with on the upright posts of the field goal post. So long as at least one of the side detectors 415 is triggered (e.g., the detectors associated on the upright posts detects dispersed laser beams coming from the opposite upright post caused by the football), the side detector 415 outputs a "yes" signal indicating that, at least from the perspective of the side detector, a successful field goal attempt has been detected.

With respect to the vertical detectors 420, these operate similarly as the side detectors 415 described above. There may be one vertical detector 420 provided for each laser/detector combination associated with the crossbeam of the field goal post. Again, so long as one of the vertical detectors detects dispersed laser beams caused by the football, the vertical detector 420 outputs a "yes" indicative that at least from the perspective of the vertical detector 420 a successful field goal attempt has been detected.

Lastly, the pole detector 425 is also provided corresponding to both of the pole laser/detector pairs found on top of the upright poles. The logic for the pole detectors 425, however, is distinct from the other elements considered by the field goal controller 400. As noted above, detection of the football by the pole laser/detector is indicative that the football is not within the laser plane defined by the upright posts. Therefore, for a successful field goal attempt, the pole laser/detectors must not have detected the football during the field goal attempt. As illustrated in FIG. 4, the output for such a situation, when the football has not been detected, is "no."

An inverter 430 is provided with the pole detector 425 as a way to simplify the logic output coming from the pole detector 425. The simplification is so that the summation 435 of the various elements (e.g., side detector 415, camera detector 410, pole detector 425 and vertical detector 420) can yield a determination that successful field goal attempt has been attempted if all four outputs are "yes."

It should be noted that the field goal controller 400 is capable of determining other situations where all four elements are not providing a "yes" output but a field goal attempt is still successful. In this case, a different operation other than summation 435 may also be used to evaluate whether a field goal attempt was successful. In some embodiments, the inverter 430 may not be used and the field goal controller 400 may take note that a "no" output from the pole detector 425 is desired. Similarly, the output from the side detector 415 may be deemed unnecessary for a final determination of whether a field goal is successful so long as the vertical detectors 420 detected the location of the football. As noted above, there may be situations where the football is kicked within the area covered by the vertical detectors 420 but higher than the upright posts so that the side detectors 415 may not be capable of detecting the football. A database (not shown) may include all the various acceptable outputs from the detectors 410, 415, 420, 425 associated with the field goal controller 400 that can be associated with a successful field goal.

Once a successful field goal has been determined to have been detected by the field goal controller 400, a signal is provided to the trigger goal alarm 440. The trigger goal alarm may output a tone to indicate that a successful field goal has been detected so that one or more referees are informed. In some embodiments, the tone may be provided in such a way (e.g., via speakers) so that a stadium of onlookers can also be informed via the tone that a field goal attempt was successful. It should be noted that different tones may be provided based on whether a successful or failed field goal attempt was detected.

It should be noted that the field goal controller 400 may be capable of informing that the field goal attempt was successful using other means as well associated with the trigger goal alarm 440. For example, lights may be associated near or on the field goal post. These lights may be triggered to flash based on the output from the trigger goal alarm 440. For example lights of one color could be provided when a successful field goal attempt has been detected while a second color could be provided when a filed field goal attempt has been detected.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

Although the specification and figures may provide various embodiments directed to use of the technology herein within the realm of American football, it should be noted that the technology can be used in a variety of different events and venues including entertainment or cultural events presented at a theater, gymnasium, stadium or other facility involving a group of people. Such events may also include a variety of sporting events such as football (American and global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as museums or historic homes.

What is claimed is:

1. A system for detecting field goals comprising:
    a camera, wherein the camera is at a predetermined distance from a field goal post;
    a plurality of lasers and a plurality of detectors associated with the field goal post, wherein at least one laser and at least one detector are at a top end of the field goal post and are offset from an outside edge of the field goal post, and at least two lasers and at least two detectors are along a crossbeam of the field goal post in alternating order; and
    a processor having memory that includes instructions, the processor executing the instructions to:
        receive location-based data of a football, the location-based data being transmitted from the camera and the plurality of detectors,
        evaluate the received location-based data, and
        generate a notification for a successful field goal attempt when evaluation of the received location-based data results in a determination of success.

2. The system of claim 1, wherein the plurality of detectors are arranged in a circular fashion around each of the plurality of lasers.

3. The system of claim 1, wherein the plurality of lasers and the plurality of detectors are attached along two upright posts of the field goal post.

4. The system of claim 1, wherein the received location-based data is evaluated using data stored in a database.

5. The system of claim 1, wherein the notification is a tone outputted from a speaker.

6. The system of claim 1, wherein the notification is a light outputted from one or more lights associated with the field goal post.

7. A smart field goal detector system comprising:
    a camera that detects field goals, the camera associated with a field goal post, and including a laser filter, wherein the camera is at a predetermined distance from the field goal post;
    a plurality of vertical lasers and a plurality of vertical detectors affixed, in alternating order, to a horizontal beam of the field goal post,
    a plurality of side lasers and a plurality of side detectors affixed to two side posts of the field goal post;
    two pole lasers and two pole detectors affixed on top of the two side posts and offset from an outside edge of the field goal post; and
    a goal controller, wherein execution of instructions stored in memory of the goal controller by a processor of the goal controller:
        receives location-based data of a football, the location-based data being transmitted from the camera, the plurality of vertical detectors, the plurality of side detectors, and the two pole detectors,
        evaluates the received location-based data, and
        generates a notification for a successful field goal attempt when evaluation of the received location-based data results in a determination of success.

* * * * *